US006148887A

United States Patent [19]

Ahne

[11] Patent Number: 6,148,887

[45] Date of Patent: Nov. 21, 2000

[54] PORTABLE TOOL FOR INSTALLING CHAINS ON VEHICLE WHEELS

[76] Inventor: William T. Ahne, 4815 "J" Rd., Red Bud, Ill. 62278

[21] Appl. No.: 09/234,978

[22] Filed: Jan. 22, 1999

[51] Int. Cl.[7] .................... B60C 27/00

[52] U.S. Cl. .................... 152/213 R; 81/15.8; 254/88

[58] Field of Search .................... 152/213 R; 81/15.8; 254/88

[56] References Cited

U.S. PATENT DOCUMENTS

| | | | |
|---|---|---|---|
| 1,189,632 | 7/1916 | Seitz . | |
| 2,604,802 | 7/1952 | Rhoads | 81/15.8 |
| 3,893,500 | 7/1975 | Planz | 152/213 R |
| 3,937,263 | 2/1976 | Hill et al. | 152/213 R |
| 4,103,870 | 8/1978 | Murakami | 254/88 |
| 4,194,724 | 3/1980 | Masegian | 254/88 |
| 5,118,081 | 6/1992 | Edelman | 254/88 |
| 5,279,346 | 1/1994 | Summey | 152/213 R |
| 5,400,846 | 3/1995 | Bowman | 152/213 R |

*Primary Examiner*—Russell D. Stormer
*Attorney, Agent, or Firm*—Husch & Eppenberger, LLC; Dutro E. Campbell II

[57] ABSTRACT

A device for mounting snow chains on a vehicle tire has a base adapted to be placed on the ground, downwardly and outwardly inclined terminal portions providing runways for a vehicle wheel and a transversely concave intermediate mounting surface for supporting the vehicle tire. The top of the device has laterally-extending grooves allowing each chain cross-over to rest freely therein with ample room to properly fit the chain. A lobe is located in the center for the vehicle tire to rest upon. The outer edges of the device extend upwardly to center the vehicle tire and prevent it from slipping off the sides of the device. The bottom has saw-toothed lateral members to hold the device from slipping on the road surface and to distribute the weight of the vehicle evenly upon the road surface.

18 Claims, 4 Drawing Sheets

3
9
8
7
1
6
16
5
16
15
4
14
4
13
4
12
4
2
4
4

1
17
6
13
16
12
5
17
16
17

PORTABLE TOOL FOR INSTALLING CHAINS ON VEHICLE WHEELS

FIELD OF THE INVENTION

The present invention relates generally to a device for aiding in the mounting of anti-skid tire chains on the wheels of motor vehicles and for aiding in the removal of anti-skid tire chains from the wheels of motor vehicles. More particularly, the present invention relates to a tire chain mounting device which includes supporting ramps and obviates the need to use a car jack to lift the vehicle prior to affixing or removing tire chains.

BACKGROUND OF THE INVENTION

When a vehicle is traveling on snow and/or ice, it is generally desirable to mount chains upon the vehicle's tires to prevent skidding and slipping of the vehicle on the road. The chains will provide improved traction on a road covered with ice or snow. However, on a dry road, chains affixed on a vehicle's tires are unnecessary. Thus, motor vehicle operators must affix chains to their vehicle's tires prior to travelling on snow-covered or icy roads. Once the vehicle has left the snow and ice, the chains must be removed for travel on dry road.

One conventional method of affixing chains to vehicle tires requires the steps of spreading the chain on a road surface, mounting the car tire on one end of the chain by driving the car slowly in a forward or reverse direction upon the chain, raising the opposite end of the chain around the vehicle tire and connecting both ends of the chain. This method has several drawbacks which make it difficult to secure the chain in place around the tire. For example, when the tire comes into contact with the chain, the chain may move in an undesired fashion, making it difficult to securely fasten the chain to the tire.

Another conventional method for affixing chains to vehicle tires involves using a car jack to raise the vehicle tire off the ground, thereby allowing the chain to be wrapped around the raised tire. However, jacking up a vehicle on a wet, snowy or icy surface is dangerous because of the risk that the jack may slip out from under the vehicle and injure a person, or that the vehicle may fall on the person.

Previously, there have been other ramp-type devices which can be utilized to facilitate affixing a chain on a vehicle tire. These other ramp type devices do not have anti-slip features on their underside that comes into contact with the road surface. Furthermore, these other devices to not include a means for preventing the tires from slipping off during affixing of the chain from the vehicle tire or removing the chain from the vehicle tire.

We are aware of the following U.S. patents the disclosures of which are incorporated by reference herein:

U.S. Pat. No. 1,189,632

U.S. Pat. No. 3,893,500

U.S. Pat. No. 3,937,263

U.S. Pat. No. 4,103,870

U.S. Pat. No. 4,194,724

SUMMARY OF THE INVENTION

According to the present invention there is provided a device for affixing a chain to a vehicle tire. The device has a base adapted to be placed on the ground; downwardly and outwardly inclined terminal portions of said base providing runways for a vehicle wheel; a transversely concave intermediate mounting surface of said base for supporting the vehicle wheel; a plurality of laterally extending grooves on said base which are adapted to receive the cross members of a tire chain; a plurality of upwardly extending main members which engage the outer face of the vehicle tire as the vehicle is being driven onto or off of the device; and lateral outer edges of said main members extending upwardly to prevent the vehicle tire from slipping off the sides of the device.

The primary objective of the present invention is to facilitate the location of a tire chain upon a vehicle wheel which makes it possible to correctly and easily mount the tire-chain on the vehicle tire.

Another object of the invention is to facilitate the removal of a tire chain from a vehicle wheel which makes it possible to easily and safely remove the tire-chain from the vehicle tire.

An additional object of the invention is to provide a means for mounting tire-chains on vehicle tires for commercial vehicles, such as vans and trucks, for example, as well as vehicle tires for automobiles.

Yet another object of the present invention is to provide a means for affixing a tire chain upon a vehicle tire, having a non-skid underside that prevents the device from slipping on the slippery surface of the road.

A further object of the present invention is to provide a means for affixing a tire chain upon a vehicle which minimizes the risk of the vehicle wheel slipping off the device during operation.

These and further objects of the invention will be apparent on review of the Description of the Preferred Embodiment and the Drawings.

DESCRIPTION OF THE PREFERRED EMBODIMENT

Figures 1, 8:
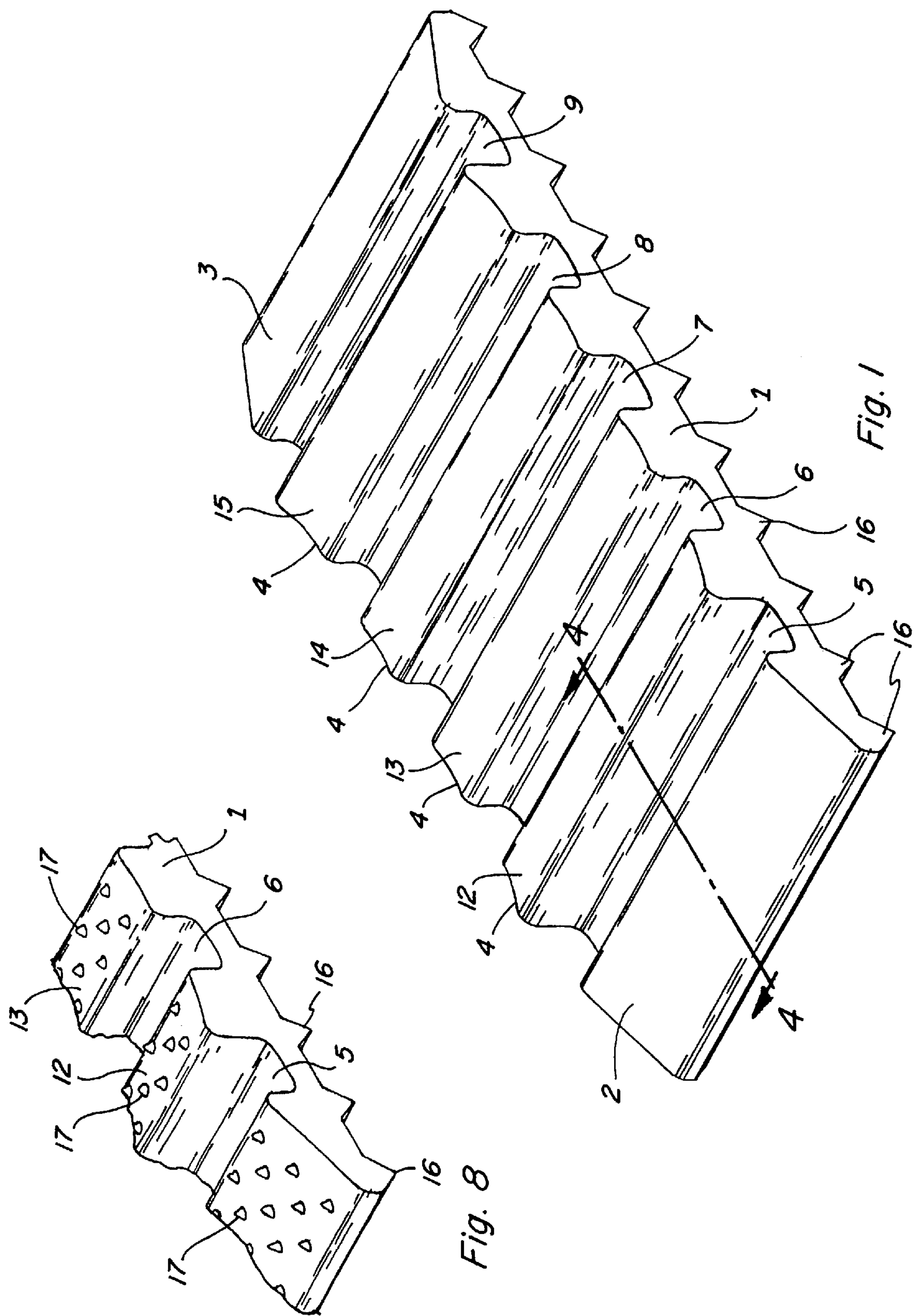
FIG. 1 is a perspective view of the present invention.
Figure 2:
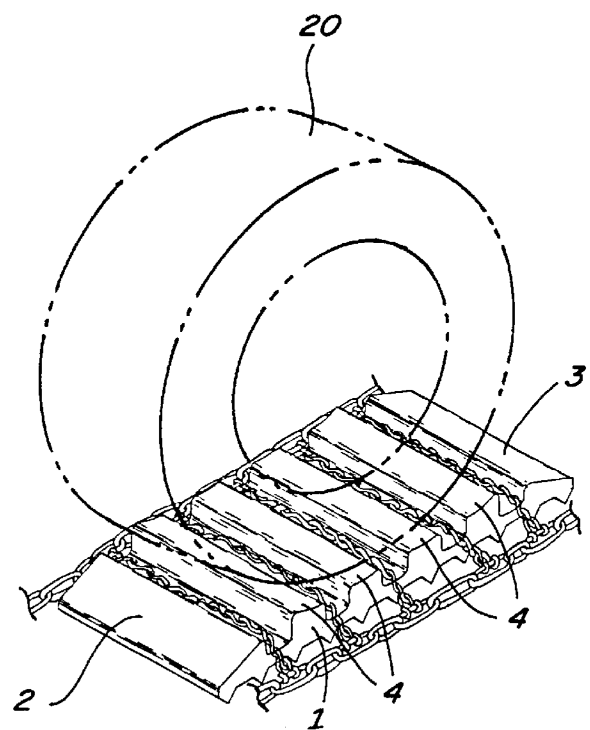
FIG. 2 is a perspective view of the present invention, showing a vehicle wheel mounted thereon and the procedure for locating the chain upon the invention.
Figure 6:
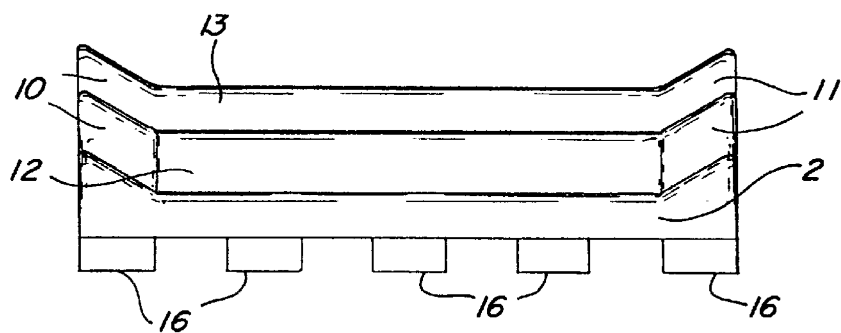
FIG. 6 is a front view of an alternative embodiment of the invention.

FIGS. 1 and 2 show the device of the invention which is composed basically of a base 1 adapted to be placed on the ground, downwardly and outwardly inclined terminal portions 2, 3 of said base 1 providing runways for a vehicle wheel 20, a longitudinally concave intermediate mounting surface 4 of said base for supporting the vehicle wheel 20, a plurality of relieved portions, such as grooves 5, 6, 7, 8, 9, on said base 1 which are adapted to receive the cross members of a tire chain, and lateral outer edges 10, 11 shown in FIG. 6, extending upwardly to prevent the vehicle tire from slipping off the sides of the device.

In accordance with the principles of the present invention, the grooves 5, 6, 7, 8, 9 are advantageously spaced apart a predetermined distance to allow for the cross members of a tire chain to fit within each respective groove 5, 6, 7, 8, 9. As shown in one particular embodiment of the present invention in FIG. 1, the grooves 5, 6, 7, 8, 9 may be laterally extending transverse grooves 5, 6, 7, 8, 9, which are advantageously spaced apart in a manner, depending on the shape and size of the tire chain being mounted upon the vehicle wheel, to receive the cross members of the tire chain. However, the grooves 5, 6, 7, 8, 9 may be otherwise configured to receive tire chains of various shapes and sizes. Furthermore, between each groove 5, 6, 7, 8, 9 is an upwardly extending main member 12, 13, 14, 15 which engages the outer face of the vehicle tire as the vehicle is being driven onto or off of the device. The main members 12, 13, 14, 15 are of sufficient length to advantageously support vehicle tires of varying sizes and vehicle tires for various different types of vehicles.

The intermediate mounting surface 4 may also be provided with other relieved areas to receive lugs or gripping members which are attached to some conventional chains, for example ring chains are provided with disc-shaped gripping members. The relieved areas would correspond to such members.

As can be best seen in FIG. 1, the upper surfaces of the main members 12, 13, 14, 15 are slightly sloped inwardly toward the center of the intermediate mounting surface 4 of the base 1, maintaining the vehicle wheel 20 in place during mounting or removal of the tire chain to or from the vehicle wheel 20. As shown in FIG. 2, during application of the tire chain upon the vehicle wheel 20, the vehicle wheel 20 rests upon the intermediate mounting surface 4 of the base 1. The intermediate mounting surface 4 is advantageously longitudinally concave, thus providing a means for securing the vehicle wheel 20 in place during mounting or removal of the tire chains to or from the vehicle wheel 20.

As can be further seen in FIG. 1 and also in FIG. 2, terminal portions 2, 3 are located on either end of the base 1 upon which the vehicle may traverse as it is driven on or off the device.

Figure 3:
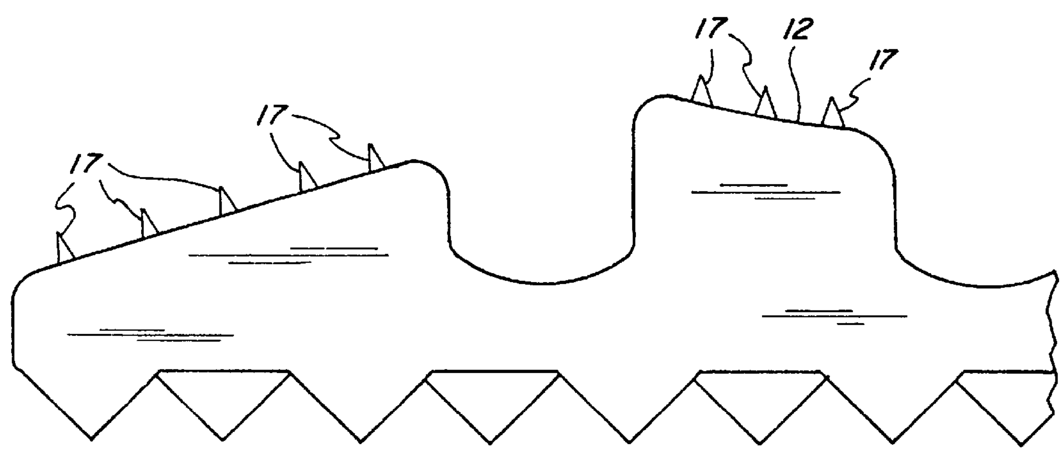
FIG. 3 is a partial side view of the present invention.

FIG. 3 shows a plurality of projections 17 extending upwardly from the terminal portion 2 of the invention. Identical projections 17 are also found extending upwardly from the other terminal portion 3 and the main members 12, 13, 14, 15 not shown in FIG. 3. These projections 17 provide a means for improving the traction of the vehicle tires upon the terminal portions 2, 3 and the main members 12, 13, 14, 15.

Figure 4:
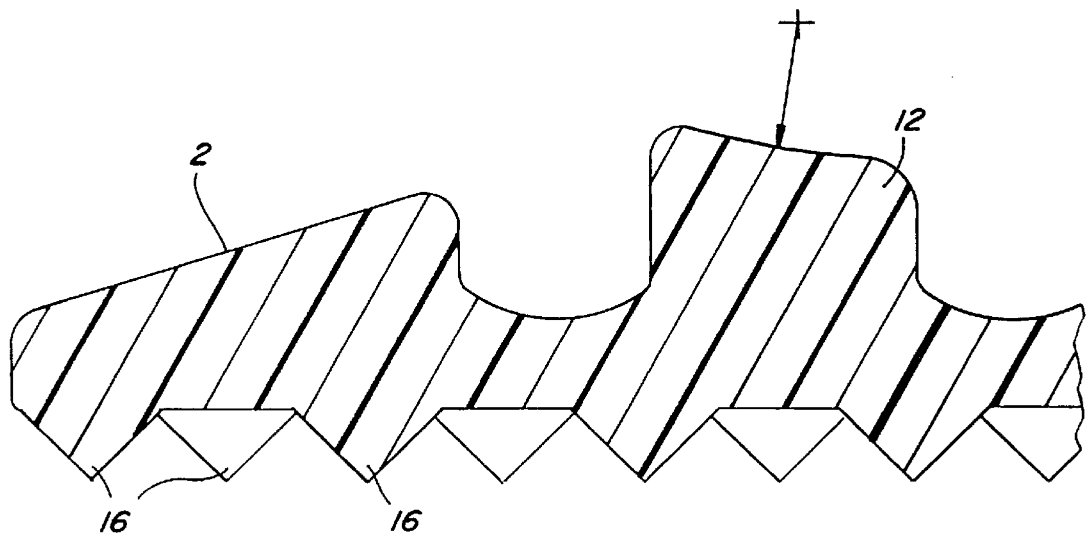
FIG. 4 is a partial sectional view of the present invention, taken along the plane of line IV—IV in FIG. 1.
Figure 5:
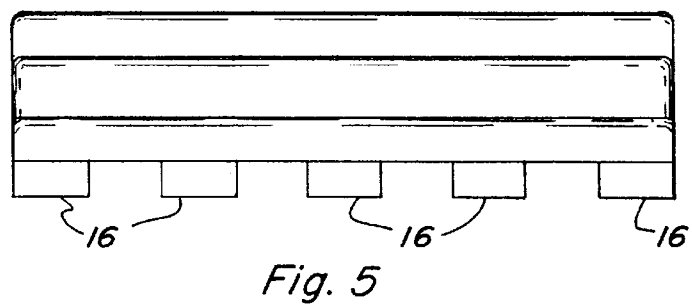
FIG. 5 is a front view of the present invention.
Figure 7:
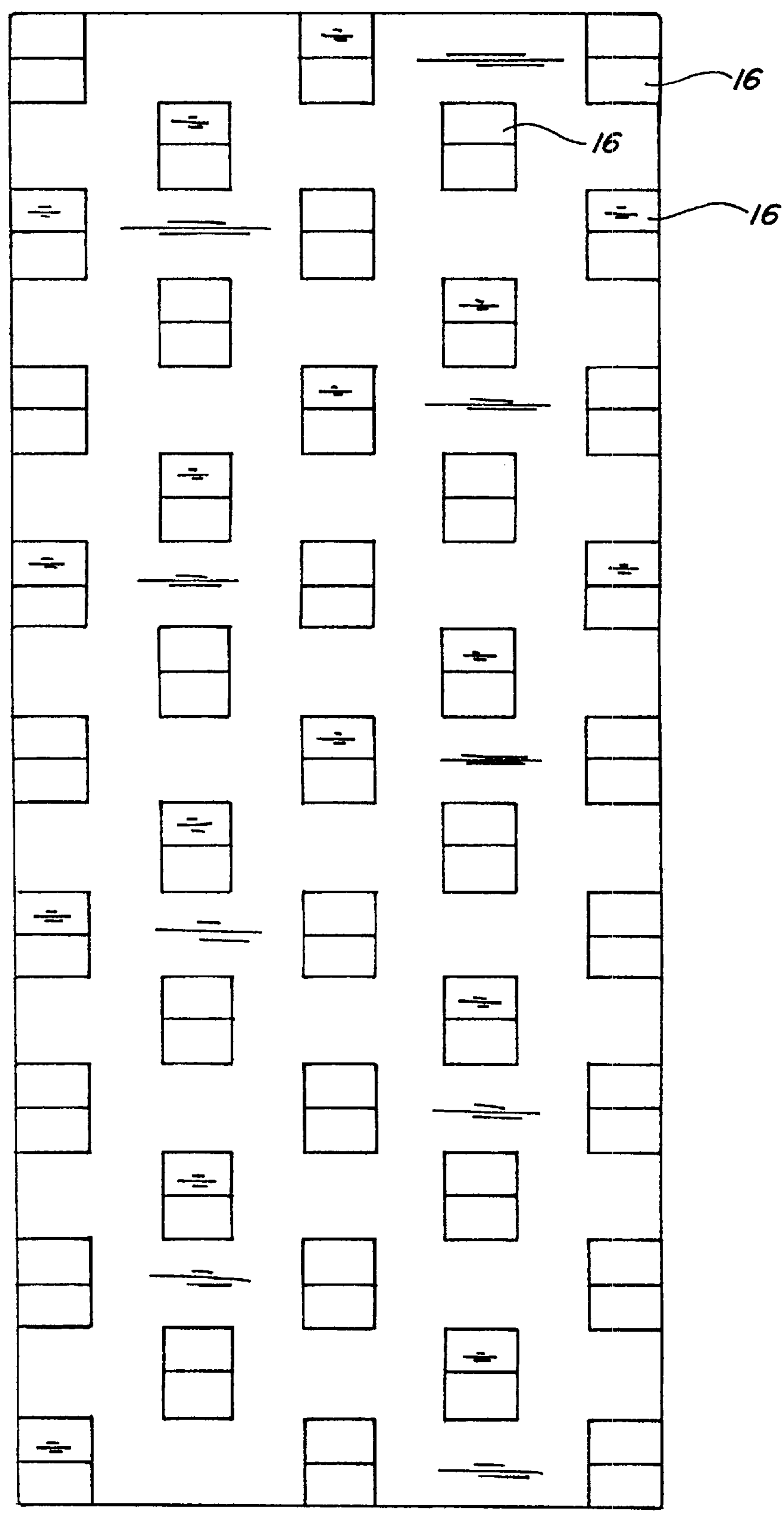
FIG. 7 is a bottom view of the present invention.

FIG. 4 is a broken sectional view of one particular embodiment of the present invention. As can be seen in FIG. 4, the lateral edges of the main members 12, 13, 14, 15 and ramps are advantageously rounded, thereby making the vehicle's travel upon the device smoother. FIG. 4 also shows the saw-toothed crossover members 16 on the underside of the device which prevent the device from slipping on the cold, wet or icy road surface. As shown in FIG. 7, these crossover members 16 are advantageously spaced apart adjacently to one another, providing an even distribution of the weight of the vehicle upon each crossover member 16 and minimizing the likelihood of the device slipping on the road surface. Furthermore, the portion of the base 1 separating the saw-toothed crossover members 16 from the main members 12, 13, 14, 15 eliminates snow packing in the device in the event that the ground is covered with snow.

FIG. 6 shows an alternative embodiment of the present invention having main members 12, 13 with upwardly raised lateral outer edges 10, 11 which center the tire and help prevent the vehicle tire from slipping off the invention while the tire chains are being affixed to the vehicle tires or while the tire chains are being removed from vehicle tires. The remaining main members 14, 15 (not shown in FIG. 6) also have identical upwardly raised lateral outer edges.

In use, a tire chain is adjusted upon the device of the invention with adjacent cross links of the chain resting in the grooves 5, 6, 7, 8, 9, as shown in FIG. 2, and the body of the device of the invention positioned with one end directly in front of and in alignment with the vehicle wheel 20 upon which the chain is to be affixed. The vehicle is then run forwardly, either by a manual force exerted upon it or by means of the vehicle motor, until the vehicle wheel 20 rests upon the transversely concave intermediate mounting surface 4 of the base 1. At this point, the vehicle is at rest and the tire chain is brought about the vehicle wheel 20 and fastened in the customary manner. After the tire chain is securely affixed upon the vehicle wheel 20, the vehicle is moved to bring the vehicle wheel 20 off from the device of the invention.

The device of this invention is preferably formed of a rigid material, such as a rigid plastic, high density polypropylene for example, which would be capable of supporting the weight of the vehicle, and in particular, the weight of large commercial vehicles. Although a lighter weight, rigid material such a rigid plastic is the preferred material of construction for the device of this invention, it is to be understood that the device could be made of other materials such as metal, aluminum or steel, for example. Fabrication of the device, either plastic or metal, may be by conventional means, as known by those skilled in the art. Furthermore, the preferred material of construction for this device can advantageously withstand temperatures below 32° F., and preferably below 0° F.

Other objects, features and advantages will be apparent to those skilled in the art. While preferred embodiments of the present invention have been illustrated and described, this has been by way of illustration and the invention should not be limited except as required by the scope of the appended claims.

I claim:

1. A device for affixing a tire chain to a vehicle tire comprising:

- a base adapted to be placed on a supporting surface, the base having;
  - downwardly and outwardly inclined terminal means for providing runways for a vehicle wheel, which have a plurality of upwardly extending conical-shaped projections for precluding said vehicle from slipping thereon;
  - an intermediate mounting surface for supporting the vehicle wheel;
  - a plurality of upwardly extending main members which engage the outer face of the vehicle tire as the vehicle is being driven onto or off of the device, said main members having a plurality of upwardly extending conical-shaped projections for precluding said vehicle tire from slipping thereon;
  - a plurality of relieved areas as a means for receiving the gripping members of a tire chain; and
  - lateral outer edges extending upwardly, providing means for centering the vehicle tire upon the device and precluding the vehicle tire from slipping off the sides of the device.

2. A device according to claim 1, wherein said means for receiving the gripping members of a tire chain include transverse grooves.

3. A device according to claim 1, having a plurality of downwardly-extending cleats arranged in a staggered pattern on the underside of the base for precluding the device from slipping on the supporting surface.

4. A device according to claim 1, wherein said relieved areas are of sufficient size to allow a tire chain to be accommodated therein for longitudinal and transverse movement with the vehicle tire on the mounting surface.

5. A device according to claim 1, wherein said upwardly extending members have rounded edges.

6. A device according to claim 1, wherein said device is comprised of a high-strength plastic base material.

7. A device according to claim 1, wherein said device is comprised of a rigid, metal base material.

8. A device according to claim 1, wherein said device is sufficiently sturdy to support the weight of a commercial carrier vehicle.

9. A device according to claim 1, wherein said intermediate mounting surface is longitudinally concave.

10. A device for affixing a tire chain to a vehicle tire comprising:

a base adapted to be placed on a supporting surface, the base having;

downwardly and outwardly inclined terminal means for providing runways for a vehicle wheel, which have a plurality of upwardly extending conical-shaped projections for precluding said vehicle from slipping thereon;

an intermediate mounting surface for supporting the vehicle wheel;

a plurality of upwardly extending main members which have rounded edges and engage the outer face of the vehicle tire as the vehicle is being driven onto or off of the device, said main members having a plurality of upwardly extending conical-shaped projections for precluding said vehicle tire from slipping thereon;

a plurality of relieved areas as a means for receiving the gripping members of a tire chain;

lateral outer edges extending upwardly, providing means for centering the vehicle tire upon the device and precluding the vehicle tire from slipping off the sides of the device; and a plurality of downwardly-extending cleats arranged in a staggered pattern on the underside of the base for precluding the device from slipping on the supporting surface.

11. A device according to claim 10, wherein said device is comprised of a rigid, metal base material.

12. A device for affixing a tire chain to a vehicle tire comprising:

a base adapted to placed on a supporting surface, the base having;

downwardly and outwardly inclined terminal means for providing runways for a vehicle tire;

four upwardly extending main members which engage the outer face of a vehicle tire as a vehicle is being driven onto or off of the device;

five relieved areas for receiving the gripping members of a tire chain;

a plurality of conical-shaped projections extending upwardly from the both the terminal means and the main members for precluding said vehicle tires from slipping thereon; and a plurality of downwardly-extending cleats arranged in a staggered pattern on the underside of the base for precluding the device from slipping on the supporting surface.

13. A device according to claim 12, wherein the main members are comprised of two innermost main members, which are closest to the center of the device, and two outermost main members, which are closest to the terminal means.

14. A device according to claim 13, wherein the outermost main members are generally parallel to the ground.

15. A device according to claim 13, wherein the innermost main members are downwardly inclined, toward the center of the device.

16. A device according to claim 12, wherein the main members define a generally arcuate area.

17. A device for affixing a tire chain to a vehicle tire comprising:

a base adapted to placed on a supporting surface, the base having;

downwardly and outwardly inclined terminal means for providing runways for a vehicle tire;

at least four upwardly extending main members which engage the outer face of a vehicle tire as a vehicle is being driven onto or off of the device;

at least five relieved areas for receiving the gripping members of a tire chain;

a plurality of conical-shaped projections extending upwardly from the terminal means and main members for precluding said vehicle tires from slipping thereon; and a plurality of downwardly extending members projecting from the underside of said base providing a means for precluding the device from slipping on the supporting surface.

18. A device for affixing a tire chain to a vehicle tire comprising:

a base adapted to placed on a supporting surface, the base having;

downwardly and outwardly inclined terminal means for providing runways for a vehicle tire;

four upwardly extending main members which define a generally arcuate area and engage the outer face of a vehicle tire as a vehicle is being driven onto or off of the device, wherein the two innermost main members are closest to the center of the device and are downwardly inclining toward the center of the device, and two outermost main members, which are closest to the terminal means and generally are parallel to the ground;

five relieved areas for receiving the gripping members of a tire chain;

a plurality of conical-shaped projections extending upwardly from the terminal means and main members for precluding said vehicle tires from slipping thereon; and a plurality of downwardly-extending cleats arranged in a staggered pattern on the underside of the base for precluding the device from slipping on the supporting surface.

* * * * *